United States Patent Office 3,435,455
Patented Mar. 25, 1969

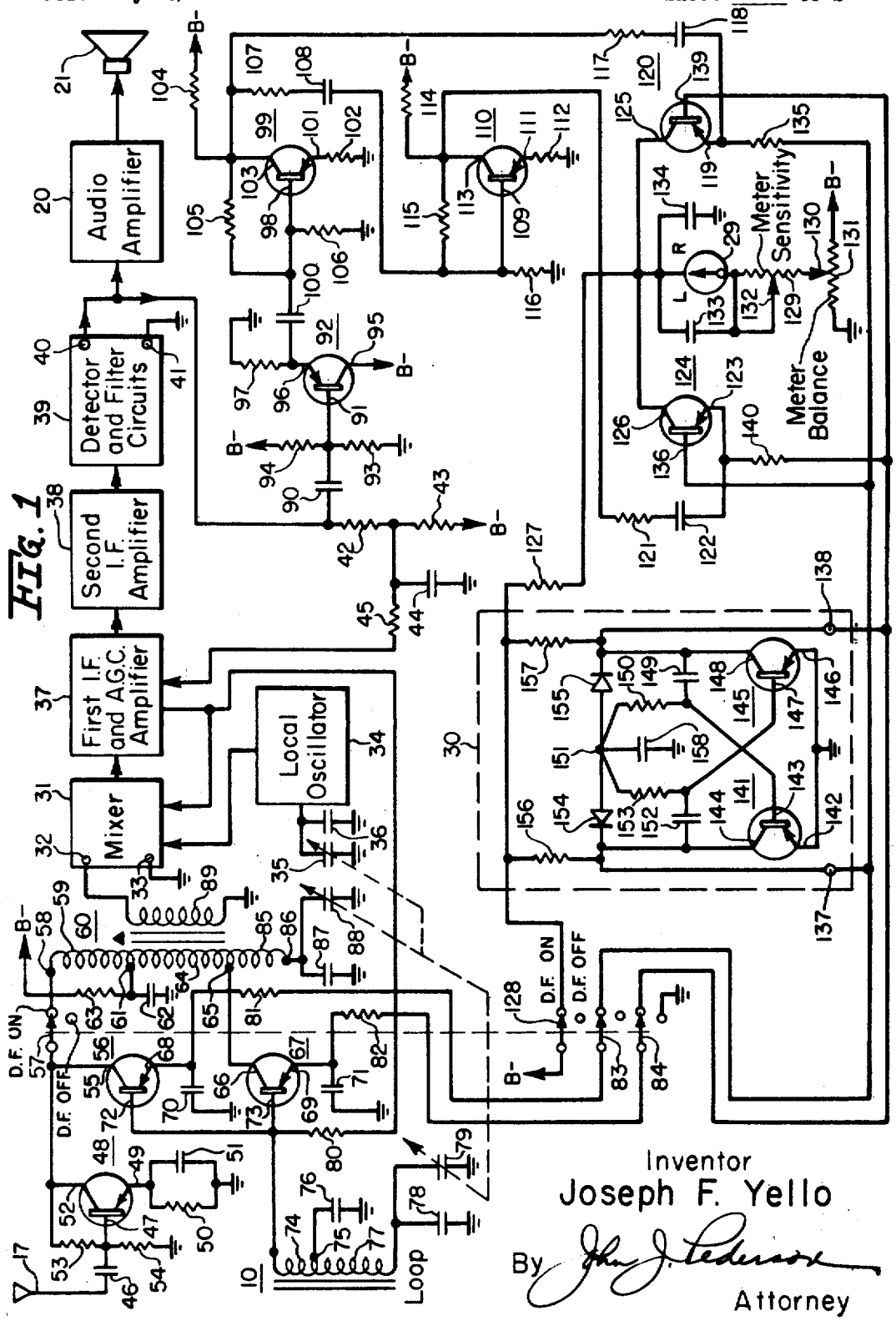

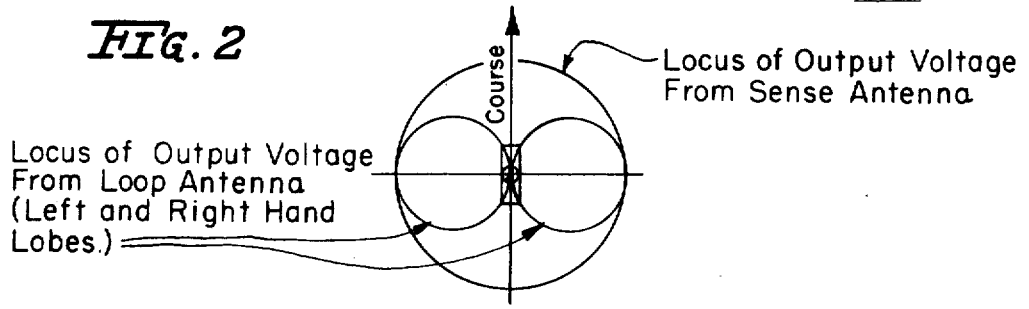
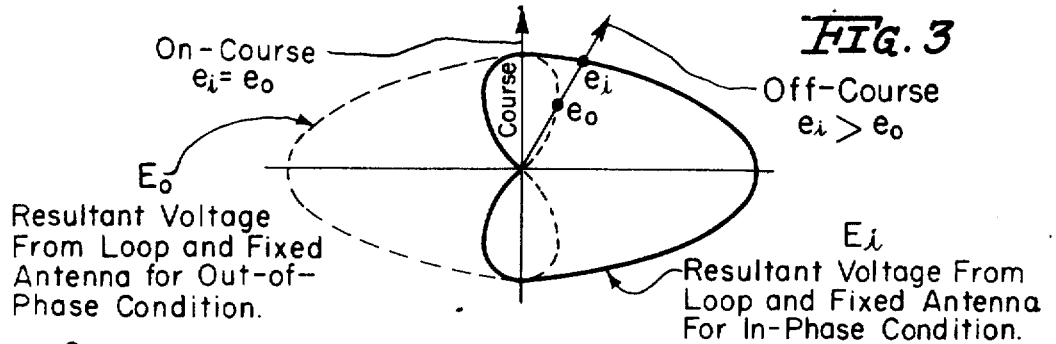
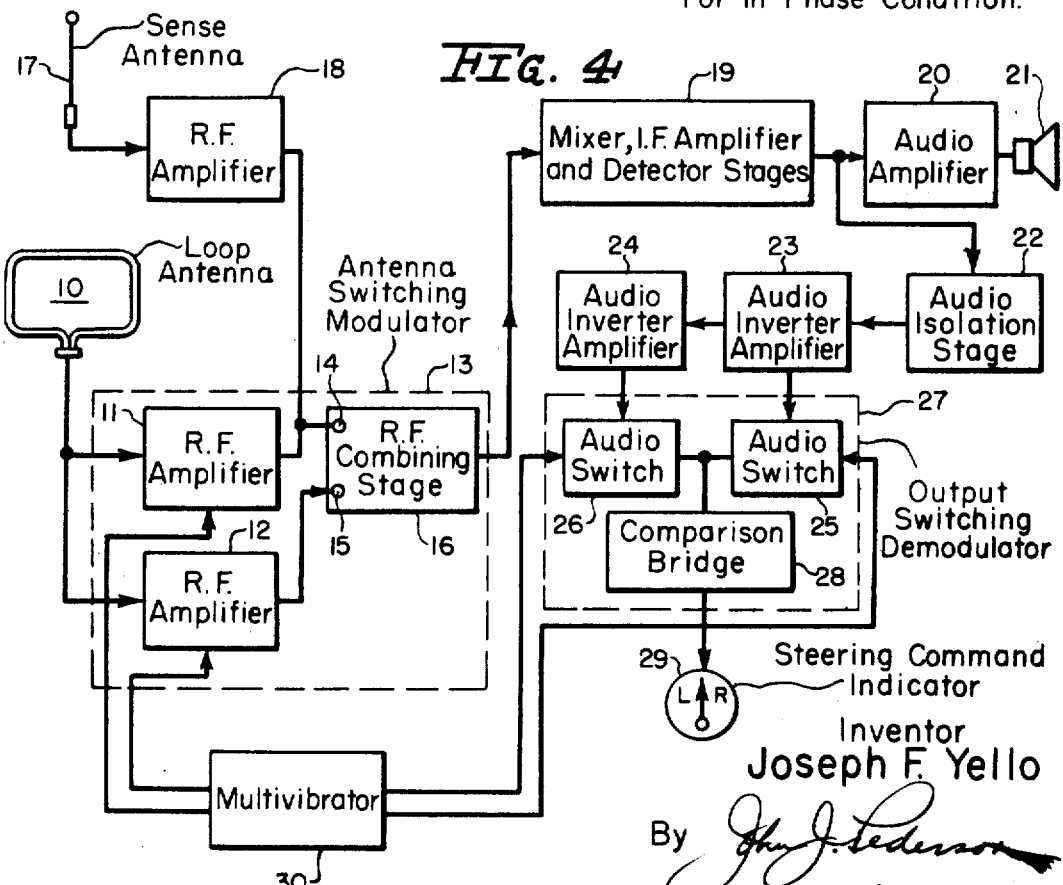

3,435,455
RADIO DIRECTION FINDER HAVING INDUCTORLESS DEMODULATOR
Joseph F. Yello, Wood Dale, Ill., assignor to Zenith Radio Corporation, Chicago, Ill., a corporation of Delaware
Filed May 29, 1967, Ser. No. 642,033
Int. Cl. G01s 5/04
U.S. Cl. 343—120                          4 Claims

ABSTRACT OF THE DISCLOSURE

A direction-finder navigation receiver comprises an antenna modulator for combining alternately in-phase and out-of-phase, in response to an applied switching control signal, the RF signals from an omni-directional sense antenna with those from a directional loop antenna to produce overlapping cardioid antenna response patterns. The system further comprises conventional radio receiver circuits and a transformerless output switching demodulator for comparing the magnitudes of the in-phase and out-of-phase signals to determine the relative bearing of a received transmission. A pair of audio switch stages contained in the demodulator alternately translate oppositely-phased detector output signals from the receiver circuits in synchronism with the alternation of antenna patterns to form a full-wave DC signal. This DC signal is applied to a comparison bridge wherein it is compared with a reference signal to provide steering commands. The switching circuitry requires no additional audio transformers and therefore is ideally suited for economical manufacture in integrated circuit form.

Background of the invention

This invention relates to radio receivers in general, and more particularly to direction finding receivers suitable for use in marine and aeronautical navigation.

Although a simple direction-finder receiver can be constructed utilizing a single directional loop antenna, the right-left ambiguity of the loop antenna response pattern would make such a receiver generally inadequate for use as a continuous automatic aid to navigation. To avoid this ambiguity and to provide a more usable output indication, direction-finder receivers intended for use in navigation generally employ the principle of compared cardioid patterns. The output of the loop antenna is combined with the output of a separate omni-directional sense antenna to obtain a cardioid antenna response pattern, the direction of which depends on the relative phasing of the two antennas. By periodically switching one antenna between an in-phase and out-of-phase condition with respect to the other and comparing the receiver outputs at the two conditions, left-right steering indications are obtained which direct an operator how to alter the heading of his craft to remain on course.

The circuitry required to effect antenna and output indicator switching in prior art navigation receivers utilized center-tapped audio transformers in conjunction with diodes alternately switched on and off by switching signals developed by a low-frequency switching control sinusoidal oscillator. While providing generally satisfactory performance in the vacuum tube era, with the advent of transistors and more recently, integrated circuits, such transformer switching circuitry has become intolerably bulky and expensive to produce.

Summary of the invention

Accordingly, it is a general object of the invention to provide a new and improved direction-finder navigation receiver of the type utilizing the principle of compared cardioid antenna patterns.

It is a more specific object of the invention to provide a new and improved direction-finder navigation receiver suitable for production in integrated circuit form.

It is a still more specific object of the invention to provide a new and improved direction-finder navigation receiver utilizing transformless switching circuitry.

The invention is directed to a radio direction-finder system for providing navigation data relating to the relative bearing of a selected radio beacon. The system comprises an omni-directional sense antenna, a directional antenna having a null axis, and a source of low-frequency switching control signals. The system further comprises an antenna modulator responsive to the switching control signals for alternately combining in-phase and out-of-phase the radio-frequency output signals from the sense and directional antennas to form a composite signal. Radio receiver circuits coupled to the antenna modulator are included for amplifying, translating and detecting the composite signal to develop normal and reverse polarity detector output signals. Means, comprising an inductorless demodulator having first and second solid-state audio amplifier devices coupled to the radio receiver circuits and switchable into conductive and non-conductive states by the switching control signals combine the normal detector output signal from the radio receiver circuits during in-phase antenna switching intervals with the inverted detector output signal from the receiver during out-of-phase intervals to produce a full-wave unidirectional output signal amplitude-dependent on the relative bearing of the selective radio beacon. The system also includes a source of unidirectional reference potential equal to the nominal value of the demodulator output signal when the received radio beacon lies along the null axis of the directional antenna and means for comparing the demodulator output signal with the reference potential to indicate the bearing of the selected radio beacon relative to the directional antenna axis.

Brief description of the drawings

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is a detailed diagram, partially in block form and partially in schematic form, of a navigation receiver constructed in accordance with the invention;

FIGURE 2 is a polar diagram of the reception characteristics of the individual antennas included in the navigation receiver of FIGURE 1;

FIGURE 3 is a polar diagram of the combined reception characteristics of the antennas included in the navigation receiver of FIGURE 1; and FIGURE 4 is a block diagram showing the principal stages of the receiver and their functional relationship.

Description of the preferred embodiment

Most direction-finder navigation receivers, including those of the invention, depend on the principle of compared cardioid antenna patterns. Two antennas are required, a sense antenna and a directional loop antenna. The sense antenna, which may comprise a short whip antenna substantially less than a quarter wavelength long, has an omni-directional horizontal-plane response characteristic represented by the circular locus of FIGURE 2. The loop antenna, which may comprise a compact and highly efficient ferrite loop stick, is represented in FIGURE 2 by a figure-8 locus with two nulls lying in opposite direction along the loop axis.

The loop antenna, while providing a null indication of the direction of a received station, is in itself inadequate for continuous automatic navigation because of the inherent ambiguity of the figure-8 locus. For instance, a loop antenna receives the same magnitude signal for all heading errors of 20°, whether they be to the right or left or to the front or back of course. A loop antenna alone does not provide what the operator needs to know, i.e., which direction to alter the heading of his craft to stay on course towards a selected radio beacon.

By combining the signals from the sense and loop antennas this ambiguity is resolved. Referring to FIGURE 3, we see that the combined response of the two antennas is a cardioid and that the cardioid may extend either to the right or left of the course, depending on whether the antennas are connected in-phase or out-of-phase. Steer-right and steer-left command indications are obtained in direction-finder navigation receivers by alternately reversing the relative phase relationship of the antennas and comparing the receiver output at the in-phase and out-of-phase conditions. If a received signal is stronger with the antennas connected in-phase than out-of-phase, as would be the case with the off-course vector of FIGURE 3, the beacon is to the right and a steer-right command is indicated. Conversely, if the received signal is stronger with the antennas connected out-of-phase than in-phase, the signal is to the left of course and a steer-left command is called for. When the received signal is of equal amplitude in both phase relationships, as shown by the on-course vector in FIGURE 3, the station lies directly in line with the axis or null of the loop antenna and no course correction is required.

A direction-finder (DF) navigation receiver constructed in accordance with the invention comprises novel antenna and output indicator switching circuitry for effecting the comparison of the overlapping cardioids, the functioning of which can be best appreciated by first considering the operation of the navigation receiver as a system. Referring to FIGURE 4, the system includes a loop antenna 10 coupled to first and second radio-frequency (RF) amplifiers 11 and 12, respectively, both of which are included in the antenna switching modulator 13. The amplified RF output signals from amplifiers 11 and 12 are applied to input terminals 14 and 15, respectively, of a combining stage 16. The system further includes a sense antenna 17 coupled to an RF amplifier 18, the output of which is applied to input terminal 14. The output of stage 16 is applied to conventional radio receiver mixer, IF amplifier and detector stages 19. The audio-frequency output signal fro mstages 19 is applied to an audio amplifier 20 wherein it is amplified to a level suitable for driving a loudspeaker 21. The output of stage 19 is also coupled through an isolation stage 22 to a first audio inverter amplifier 23 and thence to a second audio inverter amplifier 24. The oppositely-phased and equal amplitude audio output signals from amplifiers 23 and 24 are coupled to audio switch stages 25 and 26 respectively, which are included in an output switching demodulator 27. The outputs of stages 25 and 26 are applied to a comparison bridge 28, which has an output connected to a steering command indicator 29. A multi-vibrator 30 generates switching control signals which are applied to RF amplifiers 11 and 12 and to audio switch stages 25 and 26.

In operation, a selected signal is intercepted by loop antenna 10 and concurrently to the two RF amplifiers 11 and 12. The same signal is intercepted by sense antenna 17, amplified in RF amplifier 18, and applied to input terminal 14 of combining stage 16. By virtue of the switching control signal generated by multivibrator 30, only one of the two RF amplifiers is operative at a time, so that the signal from loop antenna 10 is applied to combining stage 16 either at input terminal 14 or at input terminal 15.

Assuming that on the initial half of the switching cycle amplifier 11 is operative, amplifier 12 is cut-off and the signal intercepted by loop antenna 10 is applied to input terminal 14 in-phase with the signal intercepted by sense antenna 17, the combined signals are translated as a single composite RF signal to stages 19 and the receiver has a right-hand cardioid antenna response patterns. However, during the second half of the switching cycle, amplifier 11 is cut-off and amplifier 12 is operative, causing the loop antenna signal to be applied to input terminal 15 only. The nature of combining stage 16 is such that the loop antenna signal applied to terminal 15 is combined out-of-phase with the sense antenna signal applied to terminal 14, so that the resulting composite signal, when applied to stages 19, results in the receiver having a left-hand cardioid antenna response pattern. It will be appreciated that the directions of the resulting cardioids would be reversed were the loop antenna to be rotated 180°.

The composite RF signal from combining stage 16 is amplified, translated and detected in the usual fashion in stages 19 and the resulting audio-frequency detector output signal is amplified by audio amplifier 20 to a level suitable for driving loudspeaker 21. The detector output signal from stages 19 is also applied to isolation stage 22 which serves to isolate the subsequent inverter amplifiers from the detector section of stages 19. The output signal from isolation stage 22 is serially amplified and inverted in the two inverter amplifiers 23 and 24 before being applied as oppositely-phased equal-amplitude signals to audio switch stages 25 and 26. These stages have a common output connection and are rendered conductive in alternation by multivibrator 30 to generate a full-wave DC output voltage representative of one of the antenna switching conditions, i.e., left or right cardioid patterns.

In comparison bridge 28 the DC output voltage switch stages 25 and 26 is compared with a DC reference voltage representing the nominal DC output voltage that would exist at stages 25 and 26 during reception of an on-course signal. Depending on whether the applied DC output voltage is positive or negative with respect to this nominal level, the bridge balance indicator 29 indicates a right or left steering command. Antenna switching modulator 13 and output switching demodulator 27 are driven by a common switching control signal from multivibrator 30 to assure that they will operate in synchronism and provide proper output indications.

Having considered the functioning of the direction-finder receiver as a system, the detailed circuitry of FIGURE 1 will now be examined. The receiver portion of the system is of the super-heterodyne type and includes a mixer 31 having input terminals 32 and 33 for receiving the amplified RF output signal from the antenna switching modulator. A local oscillator 34 produces a continuous-wave signal which is frequency-dependent on the setting of a variable capacitor 35 and a fixed capacitor 36. This signal is coupled to mixer 31 wherein it is heterodyned with the antenna signal applied across terminals 32 and 33 to produce an intermediate-frequency (IF) signal for application to a first IF amplifier 37, which also functions as a DC amplifier to provide amplification of the receiver AGC voltage. The amplified output of the first IF amplifier 37 is applied to a second IF amplifier 38 for further amplification and then to detector and filter circuits 39 for detection to develop an audio-frequency signal.

The audio output signal from detector 39, which appears at terminals 40 and 41, is applied to an audio amplifier 20 wherein it is amplified to a level sufficient to drive loudspeaker 21. The DC level of the audio output signal from detector 39, which is directly related to the amplitude of the detected audio signal and hence to the amplitude of the received signal, is applied to a voltage divider network connected between terminal 40 and a source of negative uni-directional operating potential, B—. This network, which serially comprises resistors 42 and 43, serves to develop a negative AGC voltage suitable for controlling the gain of the receiver IF and RF stages. A filter network comprising a capacitor 44 connected between the juncture of resistors 42 and 43 and ground and a resistor 45 connected between that juncture and first IF amplifier 37 filters out the audio signal from the AGC signal. The filtered AGC voltage is amplified by first IF amplifier 37, which concurrently serves as a DC amplifier to this AGC signal and as an IF amplifier, and applied as a gain control signal to mixer 31 and to the receiver RF stages, which in this case comprise the RF switching amplifiers in the antenna switching modulator.

The receiver section thus far described is entirely conventional in design and operation and therefore no further explanation of its operation is necessary. It will be appreciated that practically any type of receiver having suitably sensitivity and selectivity characteristics may be utilized in this application.

In accordance with the invention, the direction-finder radio navigation receiver of FIGURE 1 includes a novel antenna switching modulator for applying the signals from the sense and loop antennas at appropriate in-phase and out-of-phase relationships to input terminals 32 and 33 of mixer 31. Sense antenna 17 is coupled by a capacitor 46 to the base 47 of an RF amplifier transistor 48. The emitter 49 of transistor 48 is connected by the parallel combination of a resistor 50 and a capacitor 51 to ground. The collector 52 of transistor 48 is connected by a resistor 53 to base 47 and thence by a resistor 54 to ground. Collector 52 is further connected to the collector 55 of a first RF amplifier transistor 56 and by a single-pole double-throw mode switch 57 to one terminal 58 of a first primary winding section 59 of an RF input transformer 60. The remaining terminal 61 of winding section 59 is bypassed to ground by a capacitor 62 and connected to B— by a resistor 63.

A second primary winding section 64 of transformer 60 has a first terminal 61 common to winding section 59 and a second terminal 65 connected to the collector 66 of a second RF amplifier transistor 67. Winding section 59 is bifilar wound with winding section 64. The emitters 68 and 69 of transistors 56 and 67 are bypassed to ground by capacitors 70 and 71, and the bases 72 and 73 are connected together and to one terminal of a first winding section 74 on loop antenna 10. The remaining terminal 75 of winding section 74 is connected to ground by a capacitor 76. Another winding section 77 on loop antenna 10 has one end terminal 75 common to winding section 74 and its other end terminal connected to ground by the parallel combination of a fixed capacitor 78 and a variable capacitor 79. Bases 72 and 73 are further connected by an isolation resistor 80 to receive the amplified AGC output of first IF amplifier 37. Emitters 68 and 69 are connected by emitter resistors 81 and 82 to single-pole double-throw mode switches 83 and 84, respectively.

A third primary winding section 85 on transformer 60 has one end terminal 65 common to winding section 64 and its remaining end terminal 86 connected to ground by the parallel combination of a fixed capacitor 87 and a variable capacitor 88. The secondary winding 89 of transformer 60 has one end terminal connected to input terminal 32 of mixer 31 and its other end terminal, together with terminal 33, grounded.

In further accord with the invention, the receiver of FIGURE 1 includes a transformerless output switching demodulator for comparing the audio output signals from detector 39 at in-phase and out-of-phase antenna phasing conditions. The audio output of detector 39, which appears between output terminals 40 and 41, is coupled from terminal 40 through a capacitor 90 to the base 91 of an impedance-matching transistor 92. The base 91 of this transistor is connected to ground by a resistor 93 and to B— by a bias resistor 94. The collector 95 of transistor 92 is connected directly to B— and the emitter 96 is connected to ground by a load resistor 97 and to the base 98 of a first audio amplifier transistor 99 by a capacitor 100. The emitter 101 of transistor 99 is connected to ground by a resistor 102 and the collector 103 is connected to B— by a load resistor 104. Collector 103 is further connected to base 98 by a bias resistor 105 and thence to ground by a resistor 106.

Collector 103 of transistor 99 is coupled by the series combination of a resistor 107 and a capacitor 108 to the base 109 of a second audio amplifier transistor 110. The emitter 111 of transistor 110 is connected to ground by a resistor 112 and the collector 113 is connected to B— by a resistor 114. Collector 113 is further connected to base 109 by a bias resistor 115 and thence to ground by a resistor 116.

The collector 103 of transistor 99 is also connected by the series combination of a resistor 117 and a capacitor 118 to the emitter 119 of an audio switching transistor 120. Likewise, the collector 113 of transistor 110 is connected by the series combination of a resistor 121 and a capacitor 122 to the emitter 123 of a second audio switching transistor 124. The collectors 125 and 126 of transistors 120 and 124, respectively, are connected by a common load resistor 127 to a single-pole double-throw mode switch 128 which connects to B— during DF operation. Collectors 125 and 126 are also connected to a zero center DC meter 29 which in turn is connected through the body of a meter sensitivity potentiometer 129 to the arm 130 of a meter balance potentiometer 131. The arm 132 of potentiometer 129 is connected to the juncture of meter 29 and potentiometer 129, and the meter is shunted by an audio bypass capacitor 133. The juncture of collectors 125 and 126 is bypassed to ground by a capacitor 134.

Emitter 119 is connected by an emitter bias resistor 135 to the base 136 of transistor 124, which in turn is connected to an output terminal 137 of multivibrator stage 30. The other output terminal 138 of multivibrator 30 is connected to the base 139 of transistor 120 and to emitter 123 through an emitter bias resistor 140. Output terminals 137 and 138 are further connected to the DF ON terminals of mode switches 83 and 84, which during DF operation connect terminals 137 and 138 to the emitters of transistors 56 and 67. The DF OFF terminal of switch 84 is grounded so as to ground the emitter of transistor 67 during non-DF operation.

Multivibrator stage 30 is entirely conventional in design and employs a first transistor 141 having an emitter 142, a base 143 and a collector 144 and a second transistor 145 having an emitter 146, a base 147 and a collector 148. Base 143 is connected by a capacitor 149 to collector 148 and by a resistor 150 to a juncture 151. In similar fashion, base 147 is connected by a capacitor 152 to collector 144 and by a resistor 153 to juncture 151. A pair of diodes 154 and 155 have their anodes connected to juncture 151 and their cathodes connected to collectors 144 and 148, respectively. A pair of load resistors 156 and 157 connect collectors 144 and 148 to the DF ON terminal of mode switch 128, which connects to B— during DF operation. A bypass capacitor 158 is connected between juncture 151 and ground and collectors 144 and 148 are connected to output terminals 137 and 138, respectively.

In operation, a selected signal is intercepted by the omni-directional sense antenna 17 and coupled through capacitor 46 to transistor 48. This transistor operates as a conventional RF amplifier, and the amplified RF signal appearing at collector 52 is applied through mode switch 57 to primary winding section 59. Resistors 50, 53, 54 and 63 provide operating bias to transistor 48 and capacitor 51 is a conventional emitter bypass capacitor. For improved performance under certain conditions, other types of RF amplifier circuits may be substituted for the circuit shown here, such as the Darlington and FET (field effect transistor) type circuits. The RF amplifier may also include one or more resonant circuits gang-tuned with the local oscillator tuning capacitor.

Loop antenna 10 intercepts the selected signal concurrently with sense antenna 17. Since terminal 75 is effectively at AC ground by virtue of capacitor 76, a parallel resonant circuit is formed by winding section 77 and capacitors 78 and 79. This circuit is maintained resonant at the frequency of reception by virtue of capacitor 79 being ganged to the frequency controlling capacitor 35 of local oscillator 34. Winding section 74 forms a low-impedance pick-up link which translates the intercepted signal from the resonant loop to bases 72 and 73 of RF amplifier transistors 56 and 67, respectively. Capacitors 70 and 71 serve to bypass emitters 68 and 69 to ground at RF frequencies.

During the first half of the system switching cycle multivibrator 30 applies zero control bias to the emitter of transistor 56 and a negative control bias to the emitter of transistor 67, thereby rendering transistor 56 operative and transistor 67 inoperative. The RF signal from antenna 10 appears at collector 55 and is applied through mode switch 57 to primary winding section 59. This signal is combined in-phase with the amplified signal from sense antenna 17, and the resultant composite signal is translated by transformer 60 to mixer 31, the in-phase combination of antenna signals resulting in a right-hand cardioid antenna response pattern. To obtain selectivity, winding sections 59, 64 and 85 are tuned to resonance at the operating frequency by fixed capacitor 87 and variable capacitor 88, which is ganged to the local oscillator tuning capacitor 35. Transistors 48 and 56 receive operating power through winding section 59 and resistor 63, terminal 61 being bypassed to ground by capacitor 62.

During the second half of the switching cycle multivibrator 30 renders transistor 67 operative by applying no bias to emitter 69 and transistor 56 inoperative by applying a negative bias to emitter 68. The RF signal from loop antenna 10 now appears at collector 66 and is impressed across primary winding section 64. Winding sections 59 and 64, although bifilar wound and tightly coupled, effectively constitute a single center-tapped primary winding so that the loop antenna signal impressed on winding section 64 is translated to mixer stage 31 out-of-phase with the signal from sense antenna 17 in winding section 59. Because winding sections 59 and 64 are of equal impedance and bifilar wound, they present substantially identical loads to transistors 56 and 67 during their respective operating cycles.

Transformer 60 has an untuned secondary winding 89 and the combined outputs from the loop and sense antennas, whether in-phase or out-of-phase, are applied between input terminals 32 and 33 of mixer 31. After amplification, translation and detection by the receiver circuits portion of the system, the audio envelope at detector output terminals 40 and 41 is coupled through capacitor 90 to the base 91 of impedance-matching transistor 92. This transistor, which provides isolation to the detector, is connected as a grounded collector amplifier so as to have a high input impedance and a low output impedance. Resistors 93, 94 and 97 provide operating bias for transistor 92, and the low-impedance output signal at emitter 96 is coupled by capacitor 100 to the base 98 of transistor 99, which functions as an audio inverter amplifier. Transistor 99 receives operating power through collector load resistor 104, and bias resistors 102, 105 and 106 provide operating bias. The amplified and inverted audio signal from transistor 99 is applied to base 109 of transistor 110, another inverter amplifier, through isolation resistor 107 and coupling capacitor 108. Transistor 110 receives operating power through collector load resistor 114 and bias resistors 112, 115 and 116.

The amplified and once inverted audio signal from transistor 99 is coupled through isolation resistor 117 and coupling capacitor 118 to the emitter 119 of audio switch transistor 120, part of the output switching demodulator. During the first half of the switching cycle multivibrator 30 applies a negative bias to base 139 and emitter 123 and a zero bias to base 136 and emitter 119, rendering transistor 124 inoperative and allowing transistor 120 to translate the detector output signal impressed on emitter 119 to collector 125. The twice inverted amplified audio signal appearing at collector 113 of audio amplifier 110 is coupled by isolation resistor 121 and coupling capacitor 122 to the emitter 123 of switching transistor 124. During the second half of the switching cycle multivibrator 30 applies a negative bias to base 136 and emitter 119 and a zero bias to base 139 and emitter 123, rendering transistor 120 inoperative and allowing transistor 124 to translate the detector output signal impressed on emitter 123 to collector 126.

During the half of the switching cycle in which a particular audio switch transistor is operative, the average DC voltage at collectors 125 and 126 is dependent on the amplitude of the audio signal applied to the emitter of that transistor. Since the audio signals applied to emitters 119 and 123 are oppositely-phased, and since the audio switch transistors are switched synchronously with the antenna phase reversals, the average DC voltage existing at the collectors is a function of the relative magnitude of the detected audio signal corresponding to only one of the antenna switching conditions, i.e., the left or right cardioid antenna response patterns.

Assuming, for purposes of illustration, that a received station lies to the right of the axis of the loop antenna and hence to the right of course, the switching-rate output signal from detector 39 will be positive with respect to its axis for the first half, or right-hand cardioid, portion of the switching cycle and negative for the second half, or left-hand cardioid portion, of the switching cycle. After amplification and inversion in inverting amplifier 99, the detector output signal appearing at emitter 119 is negative for the first half and positive for the second half of the switching cycle. Conversely, by virtue of the second inversion in inverting amplifier 110, the detector output signal applied to emitter 123 is positive for the first half and negative for the second half of the switching cycle.

Multivibrator 30 switches transistor 120 on only during the first half of the cycle and therefore only the negative portion of the signal applied to emitter 119 appears across the common collector load resistor 127. Similarly, during the second half of the switching cycle only transistor 124 is operative and only the negative portion of the signal applied to its emitter 123 appears across common load resistor 127. Thus, stations lying to the right of course cause a negative full-wave DC voltage to be produced across load resistor 127 which causes the DC level on the collectors to become less positive. The opposite is true for stations lying to the left of course, since the portions of the oppositely-phased detector output signals applied to emitters 119 and 123 are positive, which causes the DC level on the collectors to be more positive. With an on-course signal there is no output from detector 39 except the carrier modulation of the received signal, which is substantially cancelled out in the switching demodulator.

The steering command meter 29 is connected in a comparison-bridge configuration with meter balance potentiometer 131 to indicate whether the DC level on collectors 125 and 126 is greater or less than the nominal DC level. This tells the operator whether a selected radio beacon is to the right or left of course. Meter sensitivity potentiometer 129 serves to vary the sensitivity of the meter by adding series resistance to the bridge circuit. Capacitor 134 bypasses extraneous noise signals to ground and has a negligible effect on the audio signals appearing at collectors 125 and 126. Capacitor 133 is shunted across meter 29 to prevent any AC signal remaining at the collectors from affecting the output indication of the meter.

Multivibrator 30 is entirely conventional in design and incorporates two transistors 141 and 145 which alternately switch each other on and off in a manner well-known to the art. Resistor-capacitor combinations 150, 149 and 153, 152 determine the oscillation rate of the multivibrator, and diodes 154 and 155 serve to steepen the rise time of the multivibrator output signal, which in the present embodiment takes the form of a 100 Hz. square wave of approximately 1 volt peak-to-peak. Resistors 156 and 157 serve as collector load resistors to transistors 141 and 145 respectively, and are connected to B— by mode switch 128 during DF operation of the system. Capacitor 158 serves as a bypass to ground for juncture 151.

During the first half of the switching cycle a negative bias of approximately one volt appears at terminal 138. This voltage is applied through mode switch 84 and emitter resistor 82 to emitter 69 of RF amplifier transistor 67 and serves to render that device inoperative. The negative bias from terminal 138 is also applied to the base 139 of transistor 120, allowing that device to become conductive, and to the emitter 123 of transistor 124, causing that device to become non-conductive. Conversely, during the second half of the switching cycle output terminal 137 assumes a negative bias of one volt. This voltage is applied through mode switch 83 and emitter resistor 81 to the emitter 68 of RF amplifier transistor 56, causing that stage to become inoperative. The same negative bias voltage from output terminal 137 is also applied to the base 136 of output switching transistor 124, allowing that device to become conductive, and to the emitter 119 of transistor 120, causing that device to become non-conductive. It will be appreciated that other switching rates and waveforms may be utilized to perform the switching function; however, the switching control signal must be such as to establish emitter-base voltages which will render the switched transistor devices alternately completely on and completely off for the particular operating bias employed. The 100 Hz. switching rate is a comprise frequency sufficiently low so as not to unduly interfere with program information conveyed by the received signal and not so high as to have harmonics which would interfere with the proper operation of the receiver. Other rates in the range of 50 Hz. to 500 Hz. have proven practical. Some advantages of the invention are achieved even when using a conventional sinusoidal oscillator instead of a multivibrator.

A navigation received constructed in accordance with the invention lends itself to integrated circuit techniques by utilizing switching circuitry which does not require the use of the audio transformers, which are extremely hard to duplicate in integrated circuit form. Furthermore, with the continuing decline in the cost of integrated circuits, it is anticipated that significant cost reductions will accrue over prior art designs.

Because the sense voltage is not applied to the loop antenna, a conventional loop antenna of the type used in non-navigation direction-finder receivers can be used without modification. Furthermore, unlike one prior art circuit which utilized the audio output stage to drive the indicator meter, the sensitivity of the output indicator is not a function of the volume control setting. Another advantage of the illustrated and preferred embodiment of the invention is the use of a square-wave switching control signal instead of a sine-wave signal. This results in the absence of residual modulation during on-course operation of the receiver, largely eliminating the annoying switching-rate buzz present in prior art receivers, which utilized sinusoidal switching control signals.

The switching circuitry of the invention is ideally suited for use in conjunction with existing radio receivers. The only modification required to convert a conventional receiver for use in a direction-finder type navigation system is the addition of a bifilar winding on the existing receiver RF input coil and the addition of the switching oscillator, antenna switching modulator and the switching demodulator, each of which is inductorless and well adapted to integrated circuit construction. The switching circuits of the invention have proved extremely stable and non-critical as to applied battery voltage.

While a particular embodiment of the invention has been shown and described, it will be obvious to those skilled in the art that changes and modifications may be made without departing from the invention in its broader aspects and, the aim in the appended claims is to cover all such changes and modifications as fall within the true spirit and scope of the invention.

I claim:
1. In a radio direction-finder system for providing navigation data relating to the relative bearing of a selected radio beacon:
   an omni-directional sense antenna;
   a directional antenna having a null axis;
   first and second radio-frequency amplifier transistors having input, common and output electrodes, said input electrodes being coupled to said directional antenna and said transistors being switchable into operative and non-operative states by an external switching control signal applied to said common electrodes;
   means comprising a radio-frequency transformer having first and second bifilar-wound primary winding sections for combining the signal from said sense antenna in-phase with the signal from said first radio-frequency amplifier transistor and out-of-phase with the signal from said second radio-frequency amplifier transistor to form a composite signal, each of said winding sections having one of its end terminals coupled to the output electrode of a respective one of said radio-frequency amplifier transistors and its remaining end terminal coupled to a source of unidirectional current for providing operating power to said transistors;
   a source of low-frequency switching control signals;
   means for applying said switching control signals to said common electrodes of said radio-frequency amplifiers to render said amplifiers operative in alternation, thereby causing the outputs of said sense and directional antennas to be alternately combined in-phase and out-of-phase;
   radio receiver circuits coupled to said combining means for amplifying, translating and detecting said composite signal, said receiver circuits providing both normal and inverted audio-frequency detector output signals;
   means comprising an inductorless demodulator having first and second solid-state audio-amplifier devices coupled to said radio receiver circuits and switchable into conductive and non-conductive states by said switching control signals for combining said normal detector output signal from said radio receiver circuits during in-phase antenna switching intervals with said inverted detector output signal from said receiver during out-of-phase intervals to produce a full-wave unidirectional output signal amplitude-dependent on the relative bearing of said selected radio beacon to said directional antenna axis;
   a source of unidirectional reference potential representative of the nominal value of said demodulator output signal when said received radio beacon lies along the null axis of said directional antenna;
   and means for comparing said demodulator output signal with said reference potential to provide an indication of the bearing of said selected radio beacon relative to said directional antenna axis.

2. In a radio direction-finder system for providing navigation data relating to the relative bearing of a selected radio beacon:
   an omni-directional sense antenna;
   a directional antenna having a null axis;
   a source of low-frequency switching control signals;
   an antenna modulator responsive to said switching control signals for alternately combining in-phase and out-of-phase the radio-frequency output signals from said sense and directional antennas to form a composite signal;

radio receiver circuits coupled to said antenna modulator for amplifying, translating and detecting said composite signal to develop normal and reverse polarity detector output signals;

means comprising an inductorless demodulator having first and second solid-state audio amplifier devices coupled to said radio receiver circuits and switchable into conductive and non-conductive states by said switching control signals for combining said normal detector output signal from said radio receiver circuits during in-phase antenna switching intervals with said inverted detector output signal from said receiver during out-of-phase intervals to produce a full-wave unidirectional output signal amplitude-dependent on the relative bearing of said selected radio beacon;

a source of unidirectional reference potential equal to the nominal value of said demodulator output signal when said received radio beacon lies along the null axis of said directional antenna;

and means for comparing said demodulator output signal with said reference potential to provide an indication of the bearing of said selected radio beacon relative to said directional antenna axis.

3. A direction-finder system as described in claim 2, wherein said first and second solid-state devices are transistors each having input, output and common electrodes and each switchable into conductive and non-conductive states by an external control signal applied to said common electrodes, said input electrodes are coupled to said radio receiver circuits to receive respective ones of said opposite-polarity detector output signals, said output electrodes are coupled together and through a common load impedance to a source of unidirectional operating potential, and said switching control signals are applied to said common electrodes to cause said transistors to be rendered operative in alternation to develop across said common load impedance said full-wave unidirectional demodulator output signal.

4. A direction-finder system as described in claim 3 wherein said source of unidirectional reference potential comprises a voltage divider manually and continuously adjustable over a predetermined range and said means for comparing said full-wave demodulator output signal with said reference potential comprises a zero-center direct-current milliammeter.

References Cited

UNITED STATES PATENTS

| | | | |
|---|---|---|---|
| 2,266,038 | 12/1941 | Hinman | 343—121 |
| 2,312,247 | 2/1943 | Gudie | 343—120 |
| 2,397,128 | 3/1946 | Cole et al. | 343—121 |
| 3,020,548 | 2/1962 | Jacobson et al. | 343—121 |

RODNEY D. BENNETT, *Primary Examiner.*

R. E. BERGER, *Assistant Examiner.*